United States Patent
Mazzarella

(10) Patent No.: US 11,458,901 B2
(45) Date of Patent: Oct. 4, 2022

(54) FIBROUS FRONT STORAGE COMPARTMENT FOR A VEHICLE

(71) Applicant: AUTONEUM MANAGEMENT AG, Winterthur (CH)

(72) Inventor: Luca Mazzarella, Winterthur (CH)

(73) Assignee: AUTONEUM MANAGEMENT AG, Winterthur (CH)

(*) Notice: Subject to any disclaimer, the term of this patent is extended or adjusted under 35 U.S.C. 154(b) by 0 days.

(21) Appl. No.: 17/051,978

(22) PCT Filed: May 6, 2019

(86) PCT No.: PCT/EP2019/061514
§ 371 (c)(1),
(2) Date: Oct. 30, 2020

(87) PCT Pub. No.: WO2019/219427
PCT Pub. Date: Nov. 21, 2019

(65) Prior Publication Data
US 2021/0237652 A1    Aug. 5, 2021

(30) Foreign Application Priority Data

May 18, 2018 (EP) .................................... 18173215

(51) Int. Cl.
*B60R 5/02* (2006.01)
*B62D 25/08* (2006.01)
*B60R 13/01* (2006.01)

(52) U.S. Cl.
CPC .............. *B60R 5/02* (2013.01); *B60R 13/011* (2013.01); *B62D 25/087* (2013.01)

(58) Field of Classification Search
CPC .... B60R 5/02; B60R 5/04; B60R 7/02; B60R 13/011; B62D 25/087
USPC ..................................... 296/37.1, 37.2, 37.14
See application file for complete search history.

(56) References Cited

U.S. PATENT DOCUMENTS

| | | | |
|---|---|---|---|
| 9,527,450 B1* | 12/2016 | Bellis | B62D 25/082 |
| 2009/0263620 A1 | 10/2009 | Balthes | |
| 2012/0164367 A1* | 6/2012 | Delmas | B29D 24/005 |
| | | | 428/85 |
| 2014/0127451 A1* | 5/2014 | Pilpel | B32B 5/12 |
| | | | 428/113 |

FOREIGN PATENT DOCUMENTS

| | | | | |
|---|---|---|---|---|
| DE | 102004022464 A1 | 12/2005 | | |
| DE | 102009054281 A1 * | 5/2011 | ............. | B60N 3/044 |

(Continued)

OTHER PUBLICATIONS

English translation of FR 3 029 825; retrieved via PatentTranslate located at www.epo.org. (Year: 2021).*

(Continued)

*Primary Examiner* — Jason S Daniels
(74) *Attorney, Agent, or Firm* — FisherBroyles, LLP; Craig W. Mueller

(57) ABSTRACT

A moulded front storage compartment for a vehicle, comprising a structural layer wherein the structural layer is shaped as a three-dimensional storage cavity for holding luggage or goods wherein the structural layer comprises at least one porous fibrous layer and wherein the at least one porous fibrous layer comprises staple fibers and a binder.

19 Claims, 2 Drawing Sheets

(56) References Cited

FOREIGN PATENT DOCUMENTS

| | | | |
|---|---|---|---|
| FR | 3029825 A1 * | 6/2016 | ............... B32B 3/26 |
| GB | 2552234 A | 1/2018 | |
| WO | 2011045364 A1 | 4/2011 | |

OTHER PUBLICATIONS

International Search Report from parent PCT/EP2019/061514, dated Nov. 21, 2019. 3 pages.
Written Opinion from parent PCT/EP2019/061514, dated Nov. 21, 2019. 5 pages.

* cited by examiner

FIBROUS FRONT STORAGE COMPARTMENT FOR A VEHICLE

This application is a national stage application under 35 U.S.C. 371 and claims the benefit of PCT Application No. PCT/EP2019/061514 having an international filing date of May 6, 2019, which designated the United States, which PCT application claimed the benefit of European Patent Application No. 18173215.7, filed May 18, 2018, the disclosure of each of which are incorporated by reference herein.

This application is also related to U.S. Patent Application Serial No. 17/051,869, filed Oct. 30, 2020, the entirety of which is incorporated by reference herein.

TECHNICAL FIELD

The invention is directed to a moulded front storage compartment for a vehicle.

BACKGROUND ART

The main storage space in a car, also referred to as the trunk, boot or luggage compartment, is often located at the rear of the car and is traditionally formed by the structural metal body floor and walls of the car, lined with protective cover materials.

The cover material is supported over its surface by the structural metal body floor and walls of the car and since the load from the luggage is mainly carried by the car body's floor, the cover material does not have to be very stiff.

Many electric cars have a storage space located at the front of the vehicle, since the power train takes less space and or the electric motor is not located at the front of the car.

Unlike at the rear of the car, the front structural body does not have a floor that can be used to form a storage space where a lining can be supported, but has only main structural beams. The trim parts located in this area of the car may be subjected to dirt, hot, cold and/or wet weather conditions.

The front storage compartment, also referred to as frunk, or luggage compartment, is therefore formed by a solid plastic structural material shaped into a three-dimensional storage cavity, simply supported around the upper rim of the storage compartment and possibly at single points under the storage compartment at the vehicles main structural beams. Such a storage compartment may need to carry up to 80 kg and must therefore be rigid and have sufficient high stiffness since the support from the body of the car may be less and not over the entire surface of the side facing the road. The solid plastic materials used for such a luggage compartment are heavy and not providing any significant noise attenuation.

It is therefore the object of the current invention to provide an alternative material to form the front storage compartment overcoming the problems of the current solution in particular to reduce weight and enhance acoustic properties.

SUMMARY OF INVENTION

The object of the invention is achieved by a front storage compartment according to claim 1.

A moulded front storage compartment for a vehicle, comprising a structural layer wherein the structural layer is shaped as a three-dimensional storage cavity for holding luggage or goods wherein the structural layer comprises at least one porous fibrous layer and wherein the at least one porous fibrous layer comprises staple fibers and a binder. The front storage compartment for a vehicle according to the invention is suitable for being mounted in the front region of a vehicle, such as a car.

Surprisingly a porous fibrous layer comprising staple fibers and a binder can be formed in a strong three dimensional shape and wherein the at least one porous fibrous layer has sufficient strength and stiffness. Since the at least one porous fibrous layer has enough strength and stiffness no other structural layers are needed and the storage compartment may consist of only the at least one porous fibrous layer according to the invention possibly with additional scrim or film layers and or decorative layers not substantially contributing to the overall stiffness of the moulded front storage compartment.

Surprisingly the required strength and stiffness of the at least one porous fibrous layer can be achieved, by using high and low melt staple fibers.

The at least one porous fibrous layer according to the invention is structural in the sense of being able to mostly keep its shape, but also being stiff enough to substantially maintain its shape when loaded with luggage or goods.

The at least one porous fibrous layer is also structural in the sense of keeping its form and elasticity also under load and or after long periods of exposure to higher temperatures as well as after aging.

Preferably the binder is either a thermoplastic binder, preferably polyester, polyamide or polypropylene, or a thermoset binder, preferably epoxy resin or phenolic resin.

By using such binders enough stiffness and strength of the at least one porous fibrous layer may be achieved.

The staple fibers are preferable at least one of organic fibers, such as cotton, kenaf, hennep, or thermoplastic fibers such as polyester preferably PET or PBT, or polyamide, preferably polyamide-6 or polyamide 6,6, or polyolefin preferably polypropylene or polyethylene, or inert fibers, preferably glass fibers, carbon fibers or ceramic fibers, or mixtures thereof.

By using such fibers enough stiffness and strength of the at least one porous fibrous layer may be achieved. Depending on the final load on the bottom surface in the storage cavity the fibers or fiber mixture can be adapted, for instance a full polyester solution can be taken with polyester staple fibers and a copolymer of polyester as the binder, while at high load combination with inert in particularly glass fibers in combination with polypropylene or thermoset binder might be preferred. In order to reduce cost recycled fibers in combination with polypropylene binder is a preferred alternative.

Preferably the staple fibers are virgin, reclaimed or recycled origin, preferably including a shoddy mixture of cotton, polyester or synthetic fibers.

The amount of the binder, in weight percentage of the at least one porous fibrous layer, is preferably between 10 and 50%, preferably between 20 and 40% in order to improve the bond between the stable fibers and providing an air permeable porous fibrous layer.

Preferably the at least one porous fibrous layer has a flexural modulus of at least 70 Mpa, preferably between 70 and 1300 MPa, preferably between 100 and 950 MPa, preferably between 150 and 900 MPa, measured according to the current ISO 178, in order to be able to hold luggage or goods without deforming too much. The measurements have been performed at, according to the ISO 178 specified, 23 degree Celsius and 50% relative humidity.

Surprisingly already a very thin compressed porous fibrous layer according to the invention achieves enough strength and stiffness. Preferably the at least one porous fibrous layer has a thickness between 0.5 and 7 mm, preferably between 1 and 5 mm, preferably between 1 and 3 mm.

Preferably the diameter of the staple fibers is between 14 to 37 microns, preferably between 20 to 25 microns, for increased strength.

Preferably the at least one porous fibrous layer has an area weight between 500 and 2500 g/m², preferably between 700 and 2000 g/m², preferably between 1000 and 1600 g/m².

The at least one porous fibrous layer is preferably air permeable in order to be noise absorbent and has preferably an air flow resistance (AFR) between 100 to 8000 Ns/m³, preferably between 300 to 5000 Ns/m³, preferably between 1000 to 3000 Ns/m³, measured according to current ISO 9053, using the direct airflow method, method A.

The front storage compartment according to the invention may further comprise a rim for mounting the front storage compartment in the vehicle, wherein the rim comprises a porous textile material which is preferably made of the same material as the at least one porous fibrous layer and where, in order to further enhance the noise absorption, the rim preferably covers an area up to the complete area covered by the vehicles front hood.

By increasing the surface area of the rim comprising the at least one porous fibrous material, the overall absorption and noise reduction in the front of the vehicle may be improved.

The rim may be made as a separate part mounted to the front storage compartment and to the vehicle and may comprise the same material as the at least one porous fibrous layer and or may be made of another fibrous material.

For embodiments where the rim comprises the same material as the at least one porous fibrous layer, the rim may be made monolithic with the at least one porous fibrous layer forming the three-dimensional storage cavity.

The front storage compartment according to the invention preferably further comprises means for mounting the front storage compartment to the vehicle. Preferably the front storage compartment is mounted at least at the rim, for example by punch or screw clips or screws in combination with a nut or a clip; however other more elaborate solutions are possible as well.

In order to further enhance the stiffness of the front storage compartment the at least one porous fibrous layer according to the invention may comprise stiffening corrugations and or ribs. Such corrugations and or ribs may be created during layer moulding of the at least one porous fibrous layer.

The moulded front storage compartment according to the invention may comprise further layers situated on the inner or outer surface of the cavity forming the storage compartment, such as a film or foil. The film or foil is preferably at least partly perforated to maintain or enhance the acoustic performance of the at least one porous fibrous layer. Situated on the outer surface should be understood as the additional absorbing layer being connected being connected moulded front storage compartment for example being laminated or glued.

Preferably the film or foil is made of thermoplastic polymer such as, thermoplastic olefin, low-density polyethylene, thermoplastic polyurethane, polyester, copolyester, polyimide, polyethylene or similar and the film or foil may be impervious or perforated. The foil or film is preferably laminated to the fibrous layer during moulding of the storage compartment.

Alternative a breathable foamed layer may be used containing pin holes to enable vapour transmission between the cavity space and the area surrounding the cavity.

The moulded front storage compartment according to the invention may further comprise a decorative layer on at least part of the inside of the storage compartment, such as a carpet e.g. a tufted or needle punch carpet, non-woven layer, textile knit layer, rubber layer or flocked layer.

This decorative layer may also have the function to provide a soft surface in order to protect the at least one porous fibrous layer.

Alternatively also a carpet mat or rubber mat might be used to cover at least partly the inner side of the cavity. Preferably the mat is laminated or glued to the inner surface or alternatively attached with clips. Preferably it is used in conjunction to the decorative layer.

In order to further enhance the absorption, the moulded front storage compartment according to the invention may further comprise at least one additional absorbing layer situated on the outside of the at least one porous fibrous layer.

This at least one additional layer may for example be a felt or foam layer, preferably open cell foam, or a combination of felt and foam layers. The layer or layers may also be covered or wrapped in a foil in order to protect the layer from for example moist and dirt.

The moulded front storage compartment according to the invention may comprise a structural layer consisting of the at least one porous fibrous layer.

In another embodiment the structural layer may further comprise a polyester foam layer.

Preferably the structural layer further comprises a second porous fibrous layer where the polyester foam layer is situated in-between the two porous fibrous layers.

Such sandwich construction may increase the overall structural stiffness of the moulded front storage compartment even further and at least the two porous fibrous layers may contribute to the noise absorption and the acoustic performance of the moulded front storage compartment. This is in particular an advantage for front storage cases that are prone to heavy loads or in heavy duty vehicles.

The thickness of the polyester foam layer is preferably between 2 to 15 mm, preferably between 3 to 8 mm, preferably between 4 to 6 mm.

The density of the polyester foam layer is preferably between 60 to 200 kg/m³, preferably between 75 to 120 kg/m³.

The polyester foam layer is preferably thermoplastic polyester foam preferably polyethylene terephthalate (PET) foam and may be open or closed cell foam.

The moulded front storage compartment according to the invention may further comprise an air ventilation hole and or drain hole.

The front storage compartment according to the invention may further comprise at least one partition plate preferably positioned in essential horizontal and or vertical position, dividing the storage cavity into at least two sub cavities. In the case of horizontal positioned partition plate, the plate is preferably stiff enough to carry luggage or goods put inside the storage cavity. Preferably such a substantially horizontal plate may be carried by a recess in the porous fibrous layer of the storage cavity.

The at least one partition plate may comprise the same material as the at least one porous fibrous layer or be made of a sandwich construction where a polyester foam is situated in-between two layers of the two porous fibrous layer. Furthermore the partition plate may be made of know constructions such as reinforced glass fiber or honeycomb construction.

The front storage compartment according to the invention may further comprise an insert for holding tools, preferably situated at the bottom of the storage cavity. Preferable the insert comprises polypropylene foam (EPP foam).

The front storage compartment according to the invention may comprise a lid closing the storage space, wherein the lid may comprise the same material as the at least one porous fibrous layer and or other materials known in the art.

Preferably the at least one porous fibrous layer is made of a web of random laid melt spun polyester bicomponent staple fibers, wherein the staple fibers are cross-lapped and needled to form a nonwoven mat.

In this embodiment the at least one porous fibrous layer is produced by a web of random laid staple fibers that is cross-lapped and needled to form a nonwoven mat with an area weight of around 500-2500 g/m$^2$.

After moulding the at least one porous fibrous layer to the final three-dimensional shape defining the storage cavity, the layer has preferably a thickness of 0.5-7 mm, more preferably a thickness of between 1-3 mm.

By needling the cross lapped layers of the web, the nonwoven mat obtained can be handled, for instance for transfer to the moulding tool. Surprisingly the needling of the web enhances the mechanical properties of the final product significantly. By entangling the fibers they form a stronger network leading to an increase in shear force inside the at least one porous fibrous layer, enhancing the strength and stiffness of the layer. In addition by heavily needling the layer, the needles leave holes in the material, which are large enough to stay during the moulding step, reducing the AFR of the layer and therefore enhancing the acoustic absorption of the overall product.

The moulded front storage compartment can be produced according to the standard production methods known in the art with at least a moulding step. The at least one fibrous layer and optionally layers may be heated in advance to the moulding or in the same step as the moulding to obtain the consolidation of the at least one porous fibrous layer and lamination of possible optional layers to the fibrous layer. The heating is preferably made by steam moulding using preferably saturated pressurised steam process. During the moulding step the at least one porous fibrous layer is compressed and consolidated to form the three-dimensional shape of the front storage compartment.

BRIEF DESCRIPTION OF DRAWINGS

FIG. 1 shows a schematic cross-sectional view of a car (1) with a moulded front storage compartment (2) according to the invention, with the structural porous fibrous layer (3) shaped as a three-dimensional storage cavity (4). The moulded front storage compartment (2) is located in the front of the vehicle and the rim (5) of the storage compartment (2) is resting on structural beams (6) of the car body where the storage compartment is also attached to the body by for example clips. The rim is made of the at least one porous fibrous layer.

FIG. 2 shows a schematic picture of the front of a car (1) with a moulded front storage compartment (2) according to the invention, with the structural fibrous layer shaped as a three-dimensional storage cavity (4). The rim (5) of the moulded front storage compartment (2) rests on the car body where the storage compartment is also attached to the body by, for example, clips (not shown in the figure).

FIG. 3 shows a schematic picture of the front of a car (1) with a moulded front storage compartment (2) according to the invention, with the structural fibrous layer shaped as a three-dimensional storage cavity (4). The rim (7) of the moulded front storage compartment (2) extends essentially in horizontal direction covering an area up to the complete area covered by the hood (the hood is not shown in the figure). In this way the font area under the hood is not only protected but also the absorption is increased.

Figure 1:
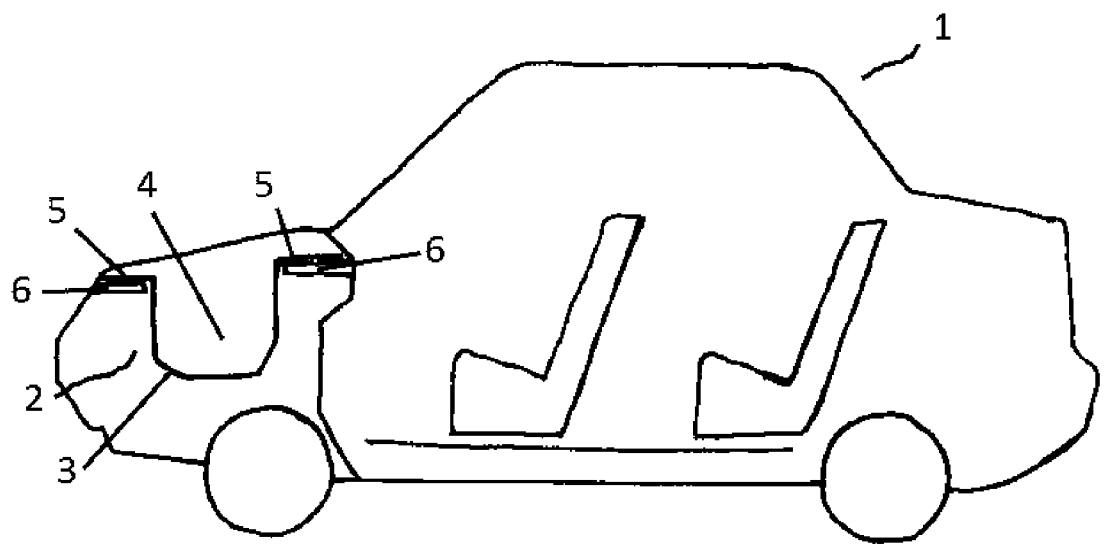
FIG. 1 is a schematic cross-sectional view of a car with a moulded front storage compartment according to the invention.
Figure 2:
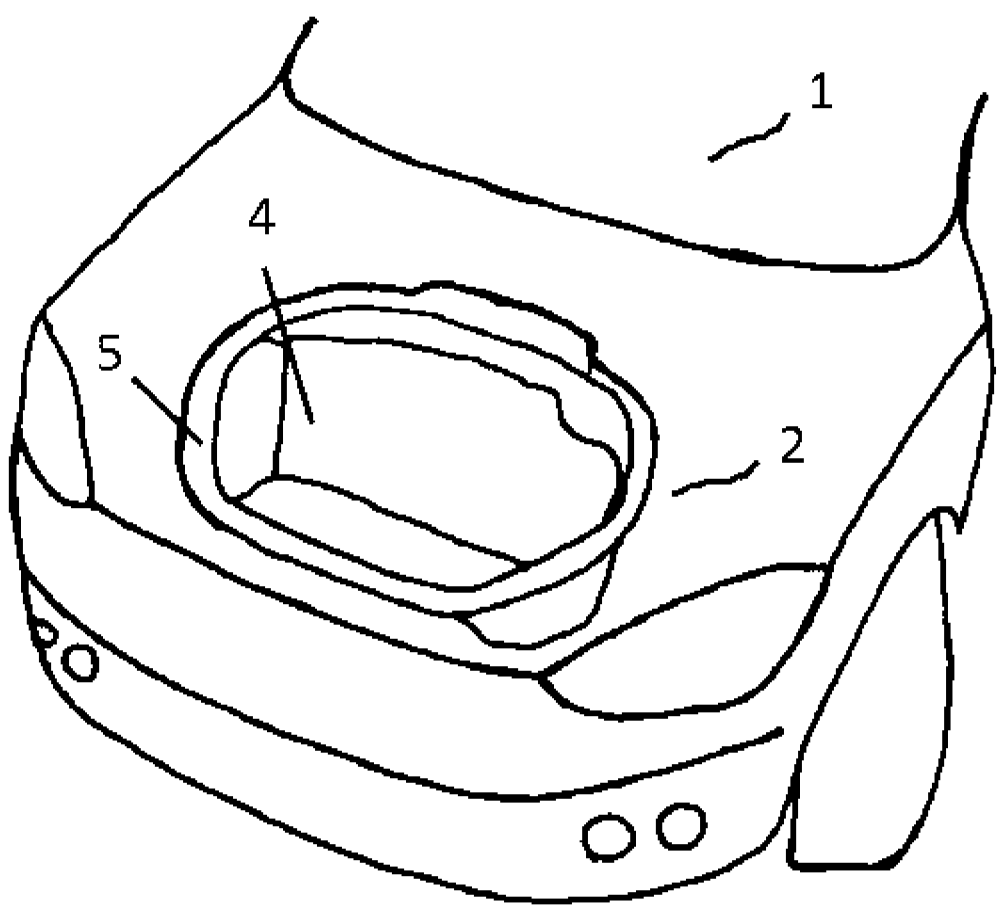
FIG. 2 is a schematic picture of the front of a car with a moulded front storage compartment according to the invention.
Figure 3:
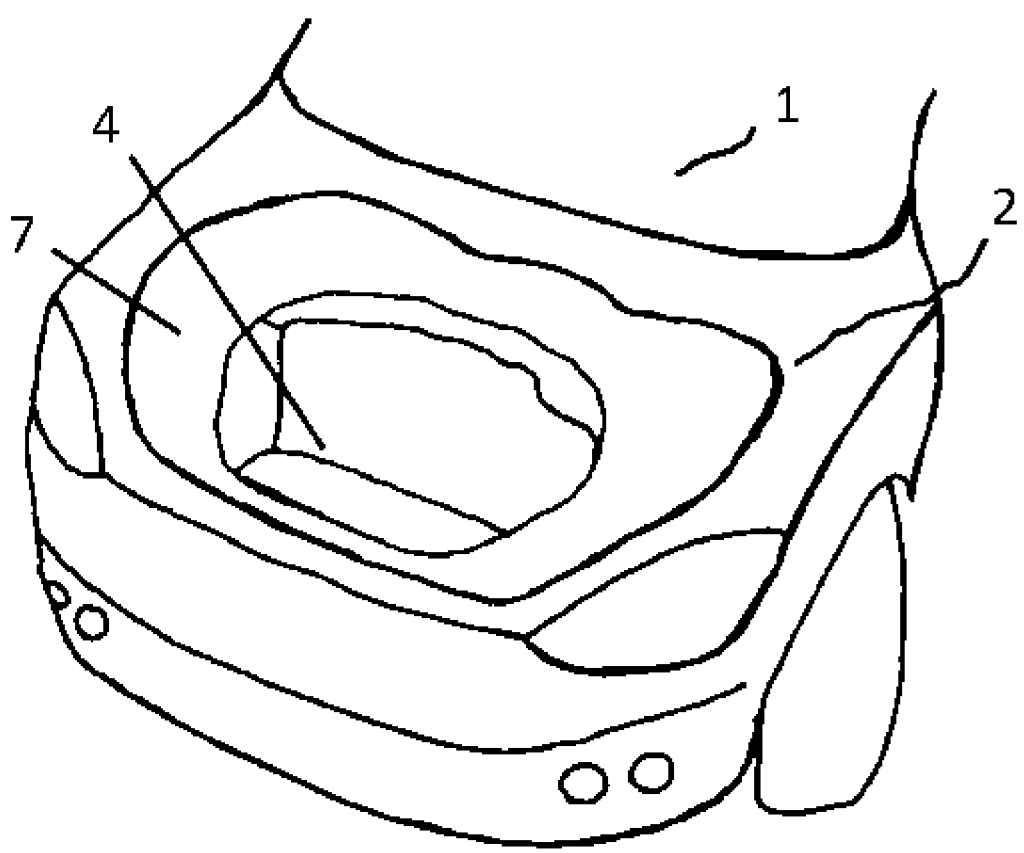
FIG. 3 is a schematic picture of the front of a car with a moulded front storage compartment according to the invention, with extended rim.

The rim (5, 7) in FIGS. 2 and 3 is preferably made of the same material as the at least one porous fibrous layer.

The invention claimed is:

1. A moulded front storage compartment for a vehicle, comprising:
   a structural layer wherein the structural layer is shaped as a three-dimensional storage cavity for holding luggage or goods, wherein the structural layer comprises at least one porous fibrous layer;
   wherein the at least one porous fibrous layer comprises staple fibers and a binder, and wherein the structural layer is self-supported, capable of being maintained only by a rim of the storage compartment.

2. The moulded front storage compartment according to claim 1, wherein the binder is a thermoplastic binder or a thermoset binder.

3. The moulded front storage compartment according to claim 1, wherein the staple fibers are at least one of organic fibers, such as cotton, kenaf, or hennep, thermoplastic fibers such as polyester polyamide, polyolefin inert fibers, carbon fibers, ceramic fibers, or mixtures thereof.

4. The moulded front storage compartment according to claim 1, wherein the staple fibers are virgin, reclaimed or recycled origin.

5. The moulded front storage compartment according to claim 1, wherein the at least one porous fibrous layer has a flexural modulus of between 70 and 1300 MPa, measured according to ISO 178.

6. The moulded front storage compartment according to claim 1, wherein the at least one porous fibrous layer has a thickness between 0.5 and 7 mm.

7. The moulded front storage compartment according to claim 1, wherein the at least one porous fibrous layer has an area weight between 500 and 2500 g/m2.

8. The moulded front storage compartment according to claim 1, wherein the at least one porous fibrous layer has an air flow resistance between 100 to 8000 Ns/m3, measured according to current ISO 9053, using the direct airflow method, method A.

9. The moulded front storage compartment according to claim 1, further comprising a rim for mounting the front storage compartment in the vehicle, wherein the rim comprises a porous textile material which is made of the same material as the at least one porous fibrous layer, the rim is covering an area up to the complete area covered by the vehicles front hood.

10. The moulded front storage compartment according to claim 1, wherein the at least one porous fibrous layer comprises stiffening corrugations and or ribs.

11. The moulded front storage compartment according to claim 1, further comprising a scrim, film or foil, being perforated or not perforated and or at least one absorbing layer situated on the outer surface of the moulded front storage compartment.

12. The moulded front storage compartment according to claim 1, further comprising a decorative layer on the inside of the storage compartment, such as a carpet, non-woven layer, textile knit layer rubber layer or flocked layer.

13. The moulded front storage compartment according to claim 1, wherein the structural layer further comprises a polyester foam layer.

14. The moulded front storage compartment according to claim 13, wherein the structural layer further comprises a second porous fibrous layer, wherein the polyester foam layer is situated in-between the two porous fibrous layers.

15. The moulded front storage compartment according claim 1, wherein the at least one porous fibrous layer is made of a web of random laid staple fibers, wherein the web of random laid staple fibers is cross-lapped and needled to form a nonwoven mat.

16. The moulded front storage compartment according to claim 1, wherein the rim comprises a porous textile material.

17. The moulded front storage compartment according to claim 16, wherein the porous textile material is made of the same material as the structural layer.

18. The moulded front storage compartment according to claim 16, further comprises means for mounting the front storage compartment to the vehicle.

19. A moulded front storage compartment for a vehicle, comprising:
a structural layer wherein the structural layer is shaped as a three-dimensional storage cavity for holding luggage or goods, wherein the structural layer comprises at least one porous fibrous layer;
wherein the at least one porous fibrous layer comprises staple fibers and a binder; and
wherein the structural layer maintains a predefined moulded shape before installation and when installed in the vehicle.

* * * * *